United States Patent [19]

Chang

[11] 4,342,473

[45] Aug. 3, 1982

[54] PRESSURE-SENSITIVE COPY SYSTEMS CONTAINING PHENOLIC ESTER AS COLOR-STABILIZERS

[75] Inventor: Cheng H. Chang, Fairfield, Ohio

[73] Assignee: Champion International Corporation, Stamford, Conn.

[21] Appl. No.: 919,086

[22] Filed: Jun. 26, 1978

[51] Int. Cl.$^3$ .......................... B41L 1/36; B32B 3/26

[52] U.S. Cl. .......................... 282/27.5; 252/316; 428/320.6; 428/320.8; 428/914; 428/537

[58] Field of Search .............. 252/316; 428/307, 914, 428/320.6, 320.8; 282/27.5

[56] References Cited

U.S. PATENT DOCUMENTS 3,244,549 4/1966 Farnham et al. .................. 282/27.5
3,856,553 12/1974 Hayashi et al. .................. 282/27.5
3,875,074 4/1975 Vassiliades et al. .............. 252/316
4,056,610 11/1977 Barber, Jr. et al. ............ 424/19 X
4,091,122 5/1978 Davis et al. .................. 282/27.5 X

*Primary Examiner*—Richard D. Lovering
*Attorney, Agent, or Firm*—Evelyn M. Sommer

[57] ABSTRACT

Pressure-sensitive material for use in a copy system comprising a substrate bearing isolated droplets, e.g., in microcapsules, of an oily solvent are provided with an acid-sensitive chromogenic compound and a phenolic ester, said phenolic ester being an oil soluble compound that is capable of stabilizing the colored marking. Upon release of the chromogen and the phenolic ester from the microcapsules or the like, the ester is hydrolyzed in the presence of moisture and an acidic material to form the corresponding phenol, which in turn, stabilizes the colored marking. In such form, the phenolic compound will not prematurely react with the chromogen, and it is shielded from any chemical reaction with materials in other parts of the copy system.

14 Claims, No Drawings

PRESSURE-SENSITIVE COPY SYSTEMS CONTAINING PHENOLIC ESTER AS COLOR-STABILIZERS

This invention relates to pressure-sensitive copy systems. More particularly, this invention relates to pressure sensitive copy systems employing phenolic esters as color-stabilizing compounds that can be converted to a form capable of stabilizing a colored image of an acid-sensitive chromogenic compound.

Pressure-sensitive marking systems involving localized contact between a chromogenic compound and a color-developing substance in localized areas where a colored marking is desired are well-known. One such system is known as a "transfer copy system", wherein a colorless dye intermediate compound, such as crystal violet lactone, is dissolved in an oily solvent and formed into minute droplets that are individually encapsulated and coated onto a substrate to form a "transfer sheet". In this manner, the chromogenic compound is isolated from an electron-accepting material of the Lewis acid type, such as an acidtreated clay, that is provided as a coating on a separate "receiving sheet".

Under the application of localized pressure by means of a stylus or the like, the capsules are ruptured, and the chromogenic compound is released and transferred to the underlying receiving sheet for reaction with the electron-accepting material to form a colored mark on the receiving sheet. Such pressure-sensitive mark-forming systems are described, for example, in U.S. Pat. No. 3,418,656 and U.S. Pat. No. 3,418,250 to A. E. Vassiliades. Often such transfer copy system comprises a top sheet having such microcapsules coated on the back (a CB sheet), a middle sheet during a electron-accepting material coated on the front and microcapsules coated on the back (a CFB sheet), and a bottom sheet having an electron-accepting material coated on the front (a CF sheet).

Another form of marking system is the "self-contained system", wherein the encapsulated chromogenic compound and the electron-accepting material are coated on the same surface of the same sheet. Upon rupture of the capsules, the chromogenic compound is released for reaction with the adjacent electron-accepting material associated therewith without any sheet-to-sheet transfer.

A number of electron-accepting materials have been used as color developing agents for reaction with the chromogenic material. Such conventional materials include bentonite, kaolin, acidic clays, talc, aluminum silicate, calcium citrate, metal oxides, metal chlorides, and phenols, including phenol and various substituted phenols.

Conventionally, the phenolic compound is coated onto the receiving sheet as an adherent coating in which the phenolic compound is accessible to the chromogenic compound, which is encapsulated in order to isolate it from the phenolic compound and is coated onto the surface of the overlying, superposed sheet as a transfer coating. The phenolic compound is applied to the receiving sheet in admixture with a binder material, such as latex or the like and additives including clay.

Various difficulties have been experienced utilizing such phenolic CF sheets. For example, upon exposure to air, the phenols are gradually oxidized converting the phenol into a brownish, non-reactive form. Additionally, ferric compounds present in the clay coating react with the phenols to form chelate compounds that develop an undesired brownish or yellowish color during preparation and storage of the recording sheet. The phenols also react with the equipment used in the preparation of the CF formulation and in the course of coating, creating a grayish color.

According to the present invention, the aforesaid disadvantages normally associated with the use of phenolic compounds can be avoided. A stabilized and intense colored marking is instantly provided upon reaction of the chromogenic compound and the Lewis acid material. The colored image would normally fade upon exposure to light and heat. However, this deficiency is corrected by incorporating a phenolic ester in an oily solvent containing an acid-sensitive chromogenic compound. Upon release of the chromogen and the phenolic ester from the microcapsules, the ester is hydrolyzed by the acidic material in the CF coating in the presence of moisture, producing the corresponding phenol which then stabilizes the colored marking before it fades. Conventionally, a second dye, such as benzoyl leuco methylene blue (BLMB), is used in addition to the fast reacting dyes, such as CVL and fluorans, to provide a permanent colored mark. The use of the phenolic ester eliminates the use of the expensive BLMB dye.

Thus, it has been discovered that the chromogenic compound and the phenolic ester may be dissolved in the oily solvent and isolated in the form of droplets such as by microencapsulation. In this manner, premature reaction with the atmosphere, with the ferric compounds in the electron-accepting material and with the equipment, is prevented. Under the action of localized pressure, the microcapsules are ruptured, thus releasing the phenolic ester and the chromogenic compound for reaction. The phenolic ester is hydrolyzed into the corresponding phenol by the action of the moisture in the coating of the electron-accepting material, while in the presence of such electron-accepting material, e.g., acidic clay.

Therefore, the phenolic ester is present in the microcapsules along with the chromogenic compound, but is in a non-reactive form. Additionally, it is protected from moisture by the capsule walls and is thereby prevented from being converted to its chromogenically-reactive form. As previously indicated, upon release from the microcapsules, the phenolic ester reacts with the moisture present in the CF sheet and is hydrolyzed into the corresponding phenol by virtue of the acid present in the clay.

The phenolic esters of the present invention are soluble in oily solvent materials that are normally utilized as a solvent for the chromogenic compound to be encapsulated. Such phenolic esters include alkyl or aryl esters of any phenolic compound that is capable of stabilizing the colored marking of an acid-sensitive chromogenic compound. Such phenolic compounds are well-known to this art, and are disclosed, for example, in U.S. Pat. Nos. 3,244,548; 3,244,549; and 3,244,550, the disclosures of which are hereby incorporated by reference.

Exemplary phenolic esters include those having the formula:

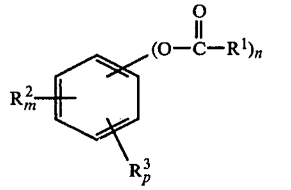

(I)

or

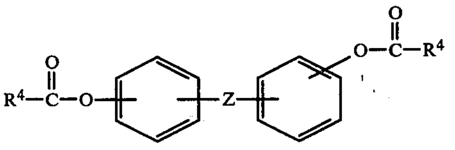

(II)

or

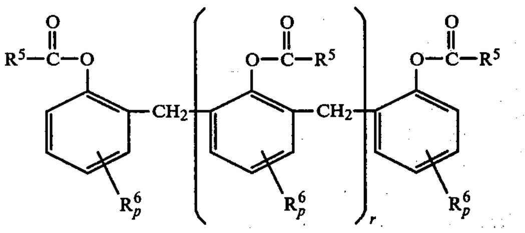

(III)

wherein:

$R^1$, $R^4$, and $R^5$ each represent an alkyl, an alkoxyaryl, or an aryl group;

$R^2$ and $R^6$ each represent an alkyl group, a thioalkyl group, an aryl group or a aralkyl group;

$R^3$ represents an alkyl group;

Z represents an alkylene group, a thio radical or an oxy radical;

m represents 0 or 1;

n represents 1 or 2;

p represents 0 or 1; and r represents 0 to 6.

Especially preferred phenolic esters according to the present invention are those having the formula:

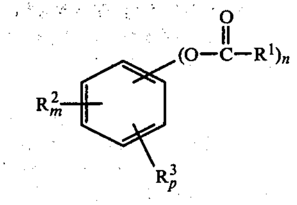

(I)

or

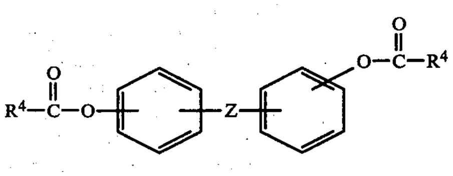

(II)

or

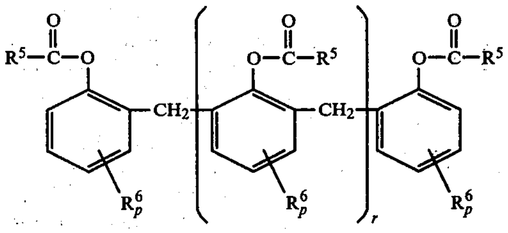

(III)

wherein:

$R^1$, $R^4$ and $R^5$ each represent a methyl group, a methoxyphenyl group or a phenyl group;

$R^2$ and $R^6$ each represent a t-amyl group, a t-butyl group, a thiomethyl group, a phenyl group or aralkyl group;

$R^3$ represents a methyl group or a t-butyl group;

Z represents a methylene group, an isopropylidene group, a thio radical, or an oxy radical;

m represents 0 or 1;

n represents 1 or 2;

p represents 0 or 1; and r represents 0 to 6.

Exemplary phenolic color-stabilizing compounds include:

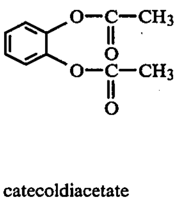

catecoldiacetate

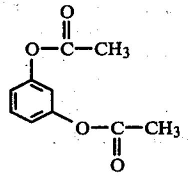

resorcinoldiacetate

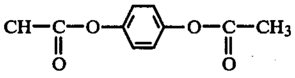

hydroquinonediacetate

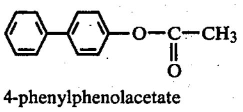

4-phenylphenolacetate

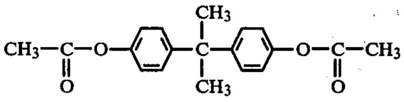

Bisphenol A diacetate

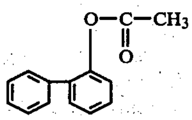

2-phenylphenolacetate

-continued

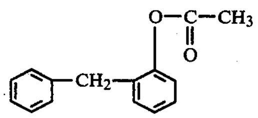

2-benzylphenolacetate

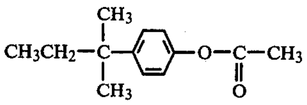

4-tert-amylphenolacetate

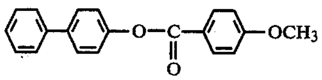

4-phenylphenol anisoate

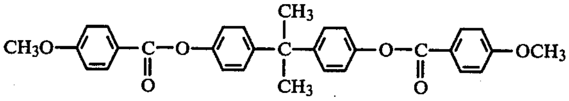

Bisphenol A dianisoate

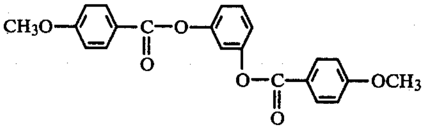

resorcinol dianisoate

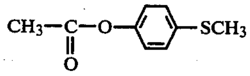

4-methylthiophenol acetate

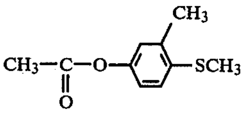

3-methyl-4-methylthiophenol acetate

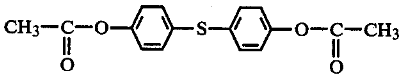

4,4'-thiodiphenol diacetate

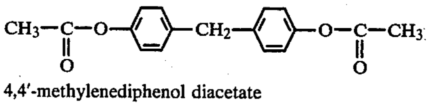

4,4'-methylenediphenol diacetate

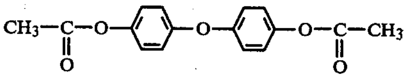

4,4'-oxydiphenol diacetate

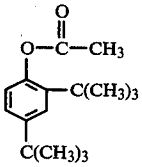

2,4-di-tert-butylphenol acetate

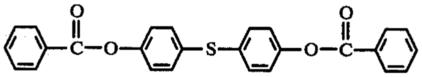

4,4'-thiodiphenol dibenzoate

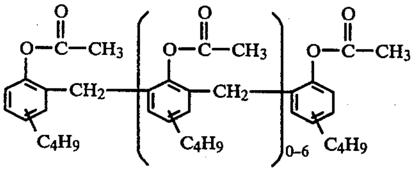

butylphenol novolac acetate

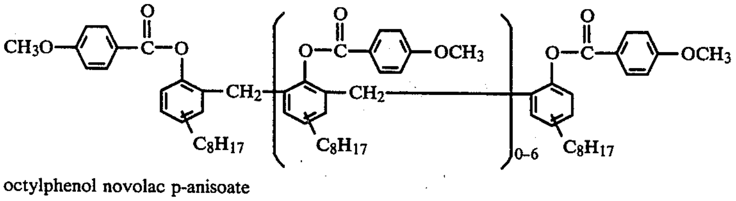

octylphenol novolac p-anisoate

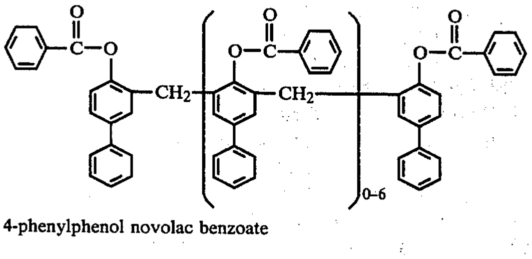

4-phenylphenol novolac benzoate

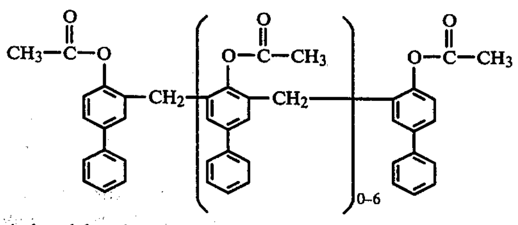

4-phenylphenol novolac acetate

-continued

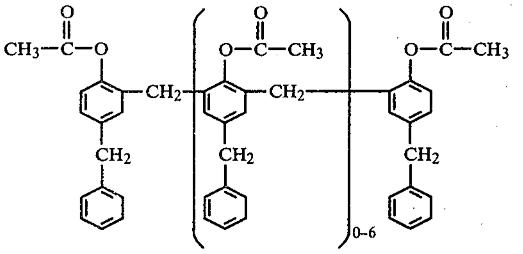

4-benzylphenol Novolac acetate

As previously mentioned, the oil-soluble phenolic esters are dissolved in the oily solvent utilized for the chromogenic compound. Suitable oily materials are those commonly utilized as solvents for chromogenic compound in encapsulation systems, and include aliphatic and aromatic hydrocarbon oils, such as kerosene, mineral spirits, naphtha, xylene, toluene, and the like. Also, solvents including terpenes, such as turpentine; esters, such as dimethylphthalate, dioctyl phthalate, dimethyl azelate, methyl 2-ethylhexanoate, 2-ethylhexyl acetate, and the like may be employed. Preferred solvent materials include the alkylated naphthalenes and an especially preferred solvent material is a combination of mono- and dialkyl naphthalenes.

The phenolic esters of the present invention may be utilized in any suitable amount, for example, between about 2 and about 20 parts by weight, preferably between about 6 and about 15 parts of the phenolic ester per 100 parts of oily solvent material. An especially preferred range is between about 8 and about 12 parts of phenolic ester per 100 parts of oily solvent.

The phenolic esters may be suitably prepared in any desired manner. For example, any phenolic compound, such as those disclosed in U.S. Pat. Nos. 3,244,548; 3,244,549 and 3,244,550, may be reacted with an acid anhydride or an acyl halide, such as acetic anhydride, acetyl chloride, benzoyl chloride, p-anisoyl chloride, or the like, at a temperature, for example, in the range of between about 20° and about 140° C., preferably between about 40° and about 80° C. under atmospheric pressures for from 1 to 5 hours, preferably about 2 to 4 hours, to form the desired phenolic ester.

Such phenolic esters are capable of being hydrolyzed to the corresponding phenol by virtue of the moisture and acid present in the CF coating. The amount of moisture normally retained in the CF coating is about 7 percent by weight.

The phenolic esters of the present invention may be utilized with any acid-sensitive chromogenic compound. Such compounds are well-known in this art and include, for example, the leuco dyes, such as crystal violet lactone and derivatives of bis(p-dialkylaminoaryl)methane, such as disclosed in U.S. Pat. Nos. 2,981,733 and 2,981,738. Other well-known color-forming materials include malachite green lactone.

Any suitable amounts of chromogenic material may be utilized. For example, in the case of crystal violet lactone (CVL), between about 0.9 and about 5.0, preferably between about 1.5 and about 4.0 parts by weight of the CVL based upon 100 parts by weight of a solvent may be utilized.

The oily solvent containing the chromogenic compound and the phenolic esters of the present invention may be encapsulated by any suitable microencapsulation process, whether physical or chemical. Thus, for example, suitable encapsulation systems include those described in U.S. Pat. Nos. 3,418,250 and 3,418,656 to A. E. Vassiliades; U.S. Pat. Nos. 3,707,514 to Vassiliades et al; and U.S. 3,779,941 to M. P. Powell, and the like.

A preferred method for producing microcapsules for use in the present invention comprises admixing:

(a) an oily solvent containing an oil-soluble phenolic ester, an acid-sensitive chromogenic compound, and a non-polymeric, polyfunctional isocyanate cross-linking agent, preferably one selected from the group consisting of 4,4'-diphenyl methane diisocyanate, triphenyl methane triisocyanate, adducts of said compounds with polyhydric alcohols, and the adduct of toluene diisocyanate with a polyhydric alcohol; and (b) an aqueous solution of an organic polymeric emulsifying agent containing a plurality of hydroxyl groups.

The admixing of the oily solvent containing the phenolic ester and the chromogenic compound with the aqueous solution of the emulsifying agent is conducted under conditions so as to form an oil-in-water emulsion, wherein the oily solvent is dispersed in the form of emulsion droplets in an aqueous continuous phase. The cross-linking agent interacts with the hydroxyl groups of the polymeric emulsifying agent to form a solid, cross-linked resinous capsule wall surrounding each of the solvent composition droplets.

Exemplary isocyanate cross-linking agents include an aduct of toluene diisocyanate with glycerol (3:1 molar), pentaerythritol (4:1 molar), hexanetriol (3:1 molar), or trimethylol propane (3:1 molar). An especially preferred isocyanate cross-linking agent is the adduct of toluene diisocyanate and trimethylol propane.

Suitably hydroxyl group-containing polymers include polyvinyl alcohol, methyl cellulose, starch and benzyl-substituted starches, such as those described in U.S. Pat. No. 3,707,514 to A. E. Vassiliades.

The microcapsules may be coated on or incorporated into a web or substrate, such as paper or a synthetic paper, and utilized in any form of pressure-sensitive copy system wherein the microcapsules are ruptured under localized pressure to release the chromogenic compound and phenolic ester for contact with an acidic coreactant. Thus, the microcapsules containing the chromogen and phenolic ester may be coated onto and/or into a substrate which is used in combination with a separate sheet or substrate that is coated with an electron-accepting acidic material. Any of the well-known acidic materials including bentonite, kaolin, acidic clays, talc, aluminum silicate, calcium citrate, metal oxides, metal chlorides, or the like may be utilized as an electron-accepting material.

As previously indicated, such multisheet type of copy system is normally referred to as a "transfer copy system", and upon rupture of the capsules by localized pressure, the phenolic ester contacts the acidic component of the record sheet and is hydrolyzed in the presence of moisture in the coating to the corresponding phenol which reacts with the chromogen to provide a colored mark. Alternatively, the microcapsules and an acidic clay, for example, may be coated onto the same substrate to form a "self-contained" or "autogenous" system, which reacts in the same manner as previously indicated, but without transferring from one substrate to another.

The microcapsules may be provided in diameters ranging from 0.1 to several hundred microns. However, microcapsules having diameters in the range of 3.0 to 5.0 microns are preferred.

The emulsion containing the microcapsules may be either coated directly onto a web material and dried, or the microcapsules may be separated from the emulsion by some physical means, such as filtration or centrifugation; washed, if desired, redispersed in a solution of a binder; coated onto a web material and dried. Suitable binders include methyl cellulose, starch, casein, polyvinyl alcohol, polyvinyl acetate latex, and styrenebutadiene latex. Alternatively, materials such as urea-formaldehyde or melamine-formaldehyde condensates may be employed.

The microcapsules containing the chromogenic material and the phenolic ester of the present invention may be coated onto the web material by any conventional means, such as by use of an air knife. The capsule coatings may be dried at temperatures ranging from about 40° C. to 70° C. At such temperatures, no appreciable degradation of the capsules, including the chromogenic compound and phenolic ester, takes place.

The web material commonly used forming such record material is paper and is, therefore, preferable in the practice of the present invention. However, the microcapsules may be coated onto other materials such as plastic, fabric or textile webs. When using a web material having a high degree of porosity, it may be advisable to pre-coat the web with a material that will reduce seepage of the microcapsular coating through the web. Impregnating the web material with polyvinyl alcohol or a butadiene-styrene latex may be conducted to provide an essentially impervious substrate.

The following examples illustrate the present invention. All percentages are by weight unless otherwise specified.

EXAMPLE 1

Five grams of 4-phenylphenol are dissolved in 50 grams of acetic anhydride in a flask. The solution is refluxed for 3 hours and then cooled to room temperature before it is added into 500 grams of ice-water with stirring for 1 hour. A white precipitate is formed and collected by filtration followed by water wash three times.

The dried product, 4-phenylphenol acetate, weighs 6.2 grams, mp. 88°-89° C.

EXAMPLE 2

The procedure of Example 1 is repeated except that resorcinol is used instead of 4-phenylphenol. The dried product resorcinoldiacetate, weighs 6.3 grams, bp 95° C./0.5 mm Hg. Infrared spectrum displays no hydroxy peak.

EXAMPLE 3

The procedure of Example 1 is repeated except that catecol is used instead of 4-phenylphenol. The product is catecol diacetate.

EXAMPLE 4

The procedure of Example 1 is repeated except that hydroquinone is used instead of 4-phenylphenol. The product is hydroquinone diacetate.

EXAMPLE 5

The procedure of Example 1 is repeated except that Bis-phenol A is used instead of 4-phenylphenol. The product is Bisphenol A diacetate.

EXAMPLE 6

The procedure of Example 1 is repeated except that 2-phenylphenol is used instead of 4-phenylphenol. The product is 2-phenylphenol acetate.

EXAMPLE 7

The procedure of Example 1 is repeated except that 4-tert-amylphenol is used instead of 4-phenylphenol. The product is 4-tert-amylphenol acetate.

EXAMPLE 8

The procedure of Example 1 is repeated except that 4-methylthio phenol is used instead of 4-phenylphenol. The product is 4-methylthiophenol acetate.

EXAMPLE 9

The procedure of Example 1 is repeated except that 3-methyl-4-methythio phenol is used instead of 4-phenylphenol. The product is 3-methyl-4-methylthiophenol acetate.

EXAMPLE 10

The procedure of Example 1 is repeated except that 4,4'-thiodiphenol is used instead of 4-phenylphenol. The product is 4,4'-thiodiphenol diacetate.

EXAMPLE 11

The procedure of Example 1 is repeated except that 4,4'-methylenediphenol is used instead of 4-phenylphenol. The product is 4,4'-methylenediphenol diacetate.

EXAMPLE 12

The procedure of Example 1 is repeated except that 4,4'-oxydiphenol is used instead of 4-phenylphenol. The product is 4,4'-oxydiphenol diacetate.

EXAMPLE 13

The procedure of Example 1 is repeated except that 2,4-di-tert-butylphenol is used instead of 4-phenylphenol. The product is 2,4-di-tert-butylphenol acetate.

EXAMPLE 14

A mixture of 5 grams of Bisphenol A in 10 grams of p-anisoyl chloride is heated at about 80° C. for one hour. The resulting solution is slowly poured into about 600 grams of ice-water, causing the formation of white solid which is the mixture of the product and p-anisic acid. The solid is extracted with 200 ml. of toluene. The extract is washed with a 2% sodium hydroxide solution twice followed by water wash until the washing is neutral. The toluene solution is dried over anhydrous sodium sulfate and toluene is distilled in vacuo. The residue is crystallized from heptane to provide 7.2 grams of Bisphenol A dianisoate, mp. 155°–157° C.

EXAMPLE 15

The procedure of Example 14 is followed except that 4-phenylphenol is used instead of Bisphenol A. The product is 4-phenylphenol anisoate.

EXAMPLE 16

The procedure of Example 14 is followed except that resorcinol is used instead of Bisphenol A. The product is resorcinol dianisoate.

EXAMPLE 17

A mixture of 5 grams of 4,4'-thiophenol and 50 grams of benzoyl chloride is heated at about 60° C. for about three hours. The solution is slowly poured into about 400 grams of ice-water and stirred for about three more hours. The solid product is washed with 400 ml. of ether three times and dried, giving 7.5 grams of 4,4'-thiodiphenol dibenzoate which melts at 152°–153° C.

EXAMPLE 18

In 100 grams of acetic anhydride are dissolved 10 grams of butyl phenol novolac resin (HRJ-463, Schenectady Chemicals, Inc., Schenectady, New York). The solution is heated at 140° C. for four hours and then allowed to cool to room temperature. The excessive amount of acetic anhydride and acetic acid generated are removed under a reduced pressure, leaving a pasty acetate of the novoloc resin.

EXAMPLE 19

The procedure of Example 18 is followed except that 4-phenylphenol novolac resin is used instead of butyl phenol novolac resin. The product is 4-phenylphenol novolac acetate.

EXAMPLE 20

Three grams of octyl phenol novolac resin are dissolved in 20 grams of dry xylene containing 5 grams of p-anisoyl chloride. The solution is stirred at about 25° C. for 30 minutes and then 5 grams of triethylamine are added. The stirring is continued overnight. The solution is filtered and distilled under vacuum to remove xylene. The residual oily product of octyl phenol novolac p-anisoate is thus obtained.

EXAMPLE 21

The procedure of Example 20 is repeated except that 4-phenylphenol novolac and benzoyl chloride are used to replace octylphenol novolac and p-anisoyl chloride.

EXAMPLE 22

Six hundred and sixty-seven grams of a 6 percent by weight aqueous solution of polyvinyl alcohol (commercially available as Elvanol 50-42 from DuPont) are charged to a Waring Blender. Meanwhile, an oil comprising a 50/50 mixture of a partially hydrogenated terphenyl and coconut oil containing 10 parts by weight the acetate of butylphenol novolac resin, 2.1 parts crystal violet lactone and 1.8 parts benzoyl leuco methylene blue and 2 parts of the oil soluble cross-linking agent, 4,4'-diphenyl methane diisocyanate are provided in 100 parts of the aforesaid oil.

Approximately 93.5 parts by volume of the oil containing the chromogens and phenolic ester are added to the aqueous polyvinyl alcohol solution under conditions of brisk agitation employing the Waring Blender. Emulsification is continued until a particle size of about 3 to 5 microns in diameter is obtained.

The emulsion is then heated while under mild agitation at a temperature of 70° C. for between about 1 and about 4 hours to form microcapsules having solid, cross-linked, oil impermeable capsule walls.

The resulting microcapsular suspension is cooled and a 5 percent aqueous solution of hydroxyethyl cellulose binder is added. The dispersion is then coated onto a paper web substrate and dried to provide a pressure-rupturable transfer sheet.

The copy sheet is superimposed over a sheet coated with an acidic clay so that the capsule coating and the clay are in contact. A ball point pen is used to produce a colored mark on the clay-coated receiving sheet. The resulting image is an intense blue which remains stable.

EXAMPLE 23

The procedure of Example 22 is repeated with the exception that the phenolic ester is omitted from the oily solvent that is encapsulated. The corresponding phenolic compound, i.e., butylphenol novolac resin, is incorporated in the acidic clay layer.

The resulting receiving sheet shows a premature brown color. After exposing this receiving sheet to ambient conditions for one week, a ball point pen is used to produce a colored mark from the capsules coated sheet in this example on the exposed receiving sheet. The resulting image fades noticeably.

This invention has been described in considerable detail with particular reference to preferred embodiments, but it will be understood that variations and modifications can be effected within the spirit and scope of the invention as described in the appended claims.

I claim:

1. Pressure sensitive material comprising a substrate bearing isolated droplets of an oily solvent containing an acid-sensitive chromogenic compound and a phenolic color-stabilizing compound, said phenolic color-stabilizing compound being an oil-soluble phenolic ester hydrolyzable to a phenolic compound capable of stabilizing the colored marking formed by said chromogenic compound.

2. The pressure-sensitive material of claim 1 wherein said phenolic ester has the formula:

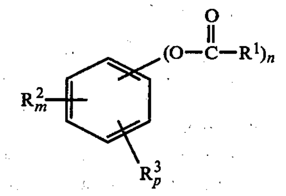

(I)

or

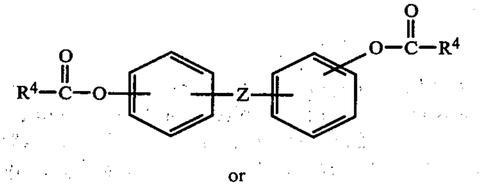

(II)

or

-continued (III)

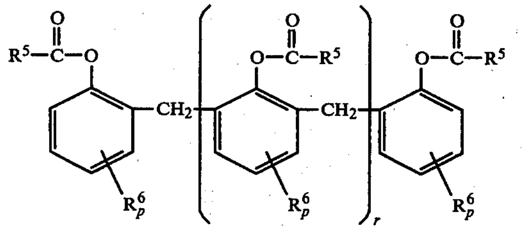

wherein:

$R^1$, $R^4$, and $R^5$ each represent an alkyl, an alkoxyaryl, or an aryl group;

$R^2$ and $R^6$ each represent an alkyl group, a thioalkyl group, an aryl group or an aralkyl group;

$R^3$ represents an alkyl group;

Z represents an alkylene group; a thio radical or an oxy radical;

m represents 0 or 1;

n represents 1 or 2;

p represents 0 or 1; and r represents 0 to 6.

3. The pressure-sensitive material of claim 2 wherein:

$R^1$, $R^4$ and $R^5$ each represent a methyl group, a methoxyphenyl group or a phenyl group;

$R^2$ and $R^6$ each represent a t-amyl group, a t-butyl group, a thiomethyl group, a phenyl group or benzyl group;

$R^3$ represents a methyl group or a t-butyl group;

Z represents a methylene group, an isopropylidene group, a thio radical, or an oxy radical;

m represents 0 or 1;

n represents 1 or 2;

p represents 0 or 1; and r represents 0 to 6.

4. The pressure-sensitive material of claim 1 wherein said oily solvent is contained in pressure-rupturable microcapsules.

5. The pressure-sensitive material of claim 4 wherein said microcapsules have walls formed of a polyhydroxy compound cross-linked by a polyisocyanate.

6. The pressure-sensitive material of claim 4 wherein said chromogenic compound is crystal violet lactone.

7. The pressure-sensitive material of claim 1, wherein said phenolic ester is about 2-20 parts per hundred of said oily solvent.

8. The pressure-sensitive material of claim 7, wherein said phenolic ester is about 6-15 parts per hundred.

9. The pressure-sensitive transfer copy system comprising a substrate bearing isolated droplets of an oily solvent containing an acid-sensitive chromogenic compound and a phenolic color-stabilizing compound, said compound being an oil-soluble phenolic ester and hydrolyzable to a form capable of stabilizing colored marking, said coated substrate being superimposed over a recording sheet bearing a coating of an electron-accepting material.

10. The pressure-sensitive copy system of claim 9 wherein said phenolic ester has the general formula:

(I)

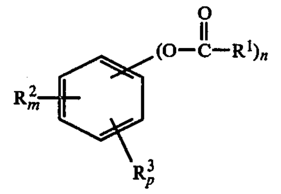

or (II)

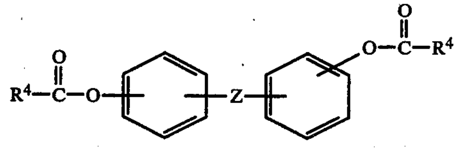

or (III)

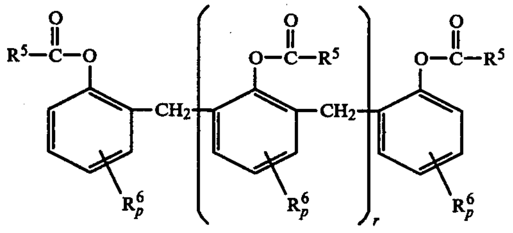

wherein:

$R^1$, $R^4$ and $R^5$ each represents an alkyl group, an alkoxyaryl group or an aryl group;

$R^2$ and $R^6$ each represents an alkyl group, a thioalkyl group, an aryl group or an aralkyl group;

$R^3$ represents an alkyl group;

Z represents an alkylene group, a thio radical or an oxy radical;

m represents 0 or 1;

n represents 1 or 2;

p represents 0 or 1; and r represents 0 to 6.

11. The pressure-sensitive copy system of claim 9, wherein said phenolic ester is about 2-20 parts per hundred of said oily solvent.

12. The pressure-sensitive copy system of claim 11, wherein said phenolic ester is about 6-15 parts per hundred.

13. The copy system of claim 9 wherein said electron-accepting material is an acidic clay.

14. The pressure-sensitive transfer copy system comprising a substrate bearing isolated droplets of an oily solvent containing an acid-sensitive chromogenic compound and a phenolic color-stabilizing compound, said compound being an oil-soluble phenolic ester and hydrolizable to a form capable of stabilizing colored marking, said coated substrate being superimposed over a recording sheet bearing a coating of an electron-accepting material, wherein said phenolic ester has the general formula:

(I)

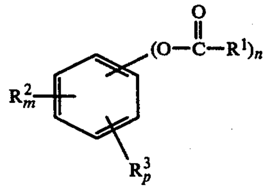

-continued or

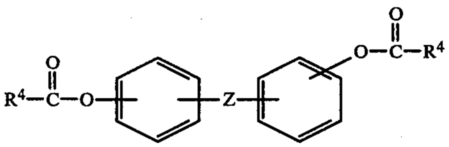

(II)

or

-continued

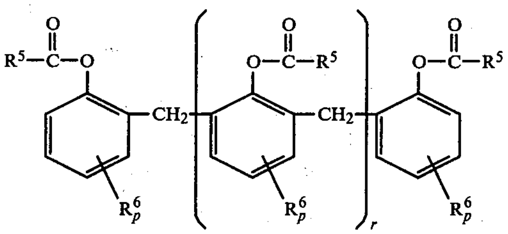

(III)

wherein:

$R^1$ represents a methyl group or a methoxyphenyl group;

$R^2$ represents a t-amyl group, a t-butyl group, a methylthio group, a phenyl group or a benzyl group;

$R^3$ represents a methyl group or a t-butyl group;

$R^4$ represents a methyl group, a phenyl group or a methoxyphenyl group;

$R^5$ represents a methyl group, a methoxyphenyl group or a phenyl group;

$R^6$ represents a butyl group, an octyl group, a phenyl group or a benzyl group;

z represents a methylene group, a dimethylmethylene group a thio radical, or an oxy radical;

m represents 0 or 1;

n represents 1 or 2;

p represents 0 or 1; and r represents 0 to 6.

* * * * *